United States Patent
Murphy

Patent Number: 5,991,690
Date of Patent: Nov. 23, 1999

[54] NAVIGATION SYSTEM INCORPORATING SIMPLIFIED LOCATION DISPLAY

[75] Inventor: Michael D. Murphy, San Jose, Calif.

[73] Assignee: Trimble Navigation Limited, Sunnyvale, Calif.

[21] Appl. No.: 08/886,873

[22] Filed: Jul. 2, 1997

[51] Int. Cl.[6] ........................... G01C 21/00; G06F 165/00
[52] U.S. Cl. ......................... 701/211; 701/213; 340/988; 342/457
[58] Field of Search ................................... 701/208, 211, 701/213; 340/988, 995; 342/357, 457

[56] References Cited

U.S. PATENT DOCUMENTS

| | | | |
|---|---|---|---|
| 5,430,655 | 7/1995 | Adachi | 364/449.3 |
| 5,459,667 | 10/1995 | Odagaki et al. | 364/449.3 |
| 5,565,874 | 10/1996 | Rode | 342/457 |
| 5,587,911 | 12/1996 | Asano et al. | 364/444.2 |
| 5,724,316 | 3/1998 | Brunts | 368/10 |
| 5,839,086 | 11/1998 | Hirano | 701/201 |

*Primary Examiner*—Michael J. Zanelli
*Attorney, Agent, or Firm*—Wagner Murabito & Hao LLP

[57] ABSTRACT

A method and apparatus for providing navigation information including a simplified location display. The mobile unit includes a GPS position determination system including a GPS antenna, a GPS receiver, and a GPS processor. The system also includes a microprocessor and a database storage device. A map database is stored in the database storage device. In operation, the simplified location display system continually displays the travel path and location along the travel path that corresponds to the current location. The user may select optional displays which include the next cross street in the direction of travel, the last cross street in the direction of travel, the next parallel cross street to the right from the direction of travel, and the next parallel cross street to the left from the direction of travel. The user may also select subsequent pathway identification labels so as to identify subsequent streets either in the direction of travel, behind the direction of travel, and to the right and the left of the direction of travel. Other optional displays include the display of current location and special-use information. Special use information includes out of region alarms, distance and time to go to edge of region, and near perimeter warnings. Alternatively, optional displays may be displayed as grid locations instead of spelling out the complete street or highway names.

17 Claims, 7 Drawing Sheets

NAVIGATION SYSTEM INCORPORATING SIMPLIFIED LOCATION DISPLAY

TECHNICAL FIELD

The present claimed invention relates to the field of navigation systems. More specifically, the present claimed invention relates to an improved navigation system with a simplified location display.

BACKGROUND ART

A typical in-vehicle navigation system includes a receiver which receives position determination data from satellites, a microprocessor, a display and a map database. Typically, the position determination data is received from global positioning system (GPS) satellites which are a part of the GPS satellite network. The position determination data is processed via an electronics package located within the receiver or by the microprocessor unit. Most prior art in-vehicle navigation systems are self contained and do not interface with any outside sources other than the fact that they receive GPS data.

Other prior art systems use a display screen which displays a whole route map and the names of the landmarks within the whole route map. These types of prior art system requires an extensive storage mechanism to store the geographical information, the landmark information, and the navigation data needed for generating an accurate map display. These systems require a display screen that is large enough to show an entire area map. The display must also be high resolution so as to adequately project a detailed map image. These display screens are expensive. In addition, these systems require extensive data storage which is expensive. Moreover, a powerful microprocessor is required for processing the extensive amounts of data and generating the complex displays. In addition, due to the complexity of the map data required to generate a full map display, and due to limitations imposed by data storage media and the cost of data storage media for storing large amounts of data, these systems typically only upload and/or store data on a small region at any particular time. This necessitates frequent uploads of data when a user travels out of the limited area of a particular database. As a result, these prior art systems are expensive and are difficult to maintain and operate.

Some prior art vehicle navigation systems use CD ROM disks for storing data. CD ROM disks are a relatively inexpensive means for storing data and they are easy to install. Thus, storing the required data on the various geographic regions and updating the data is less burdensome for each in-vehicle computing system. Since most of the geographic information and navigation information in the database is required for generating the display, the information stored in each CD ROM must be constantly available to the navigation system. Therefore, prior art systems which use CD ROM disks which contain map data require a dedicated CD ROM player for playing the CD ROM. The requirement of a dedicated CD ROM adds a significant expensive to the navigation system. This also increases the size of the system.

What is needed is an inexpensive and easy to use navigation system. In particular, a navigation system is required which is inexpensive and which provides a user with only that information which the user requires in order to navigate through a particular geographic region. In addition, a system which does not require the storage of an extensive map database is required. A system which does not require the display of a large graphic display is also required. In addition, a navigation system which reduces processing requirements such that a cost effective data processing device may be used is required. A navigation system which can use CD ROM disks is also required.

DISCLOSURE THE INVENTION

The present invention meets the above need with a vehicle navigation system which includes a simplified location display system which has a simplified display. By limiting the amount of information displayed, the amount of information to be stored and the amount of information to be processed in order to generate a navigation display is also limited. This reduces data storage requirements and data processing requirements for navigation within a given geographical area.

One embodiment of the present invention includes a simplified location display system which includes a vehicle position determination system, a data storage device and a display device. A map database is stored in the data storage device. The map database includes pathway identification labels and location identification labels and data identifying the geographic location corresponding to each pathway identification label and location identification label. Travel path labels identify alternate travel paths which run through a particular geographic area and location identification labels identify the location along the particular travel path.

The position determination system includes an antenna which receives position signals such as ephemerides broadcast from satellites of the US Global Positioning System (GPS). The GPS includes a constellation of GPS satellites, each of which broadcast ephemerides. The elapsed time of flight for each satellite's signals to reach the GPS receiver antenna, together with the ephemerides from multiple satellites is received and the data is processed by the position determination system to determine the location of the vehicle.

The location of the vehicle is compared to the data stored in the data storage medium so as to determine the travel path and the location along the travel path corresponding to the vehicle's current location. Once the travel path and location along the travel path are determined, the corresponding pathway identification label and location identification label are displayed. The pathway identification label and the location identification label corresponding to the position of the vehicle are updated as the vehicle moves.

In one embodiment, when the vehicle is traveling on a highway, the vehicle's pathway identification label is the name of the highway over which the vehicle is traveling and when the vehicle is traveling over a city street, the vehicle's pathway identification label would be the name of the street or road over which the vehicle is traveling.

The location identification label is displayed in conjunction with the pathway identification label. The location identification label identifies the vehicle's position along the pathway. For example, when a vehicle is traveling along a street that has designated block addresses, the location identification label would be the block address corresponding to the current location of the vehicle. When the vehicle is traveling over a highway that includes mile markers, the location identification label would be the mile marker corresponding to the current location of the vehicle. Over rural routes that do not have mile markers, the location identification label would indicate the distance to the nearest landmark. Landmarks would typically include city names, state borders and country borders.

Additional information, referred to as supplemental display information, may be reviewed as desired by the user using one or more control buttons located on the mobile unit. This supplemental display information includes the display of the next pathway identification label, last pathway identification label, right parallel pathway identification label, and left parallel pathway identification label. When the vehicle is moving over a city street, the next pathway identification label would indicate the next cross street in the path of the vehicle and the last pathway identification label would indicate the cross street immediately behind the vehicle. When the vehicle is moving over a city street, the right pathway identification label indicates the closest parallel street to the right of the vehicle and the left pathway identification label indicates the closest parallel street to the left of the vehicle.

In one embodiment of the present invention, the user may view subsequent streets by selecting the next label for each of the supplemental display options. Thus, for example, the user may view subsequent cross streets in the path of the vehicle by selecting the next label feature when the next pathway identification label is selected. This selection may be accomplished by pressing a switch in the direction for selection of the next label feature repeatedly. Each time the switch is pressed, the label of a subsequent cross street is displayed. After the user finishes requesting supplemental display information, the screen reverts to its default display which is the display of the location identification label and the pathway identification label corresponding to the vehicle's current position.

The resulting simplified location display system is inexpensive and simple to use and operate. In addition, since the data processing capabilities and the memory requirements for each vehicle is less than the requirements of prior art systems, significant cost savings are obtained. Also, the simplified location display is safer to use while the user is driving the vehicle since it requires only a brief glance to read as opposed to the careful study required to read a prior art map display.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1A:
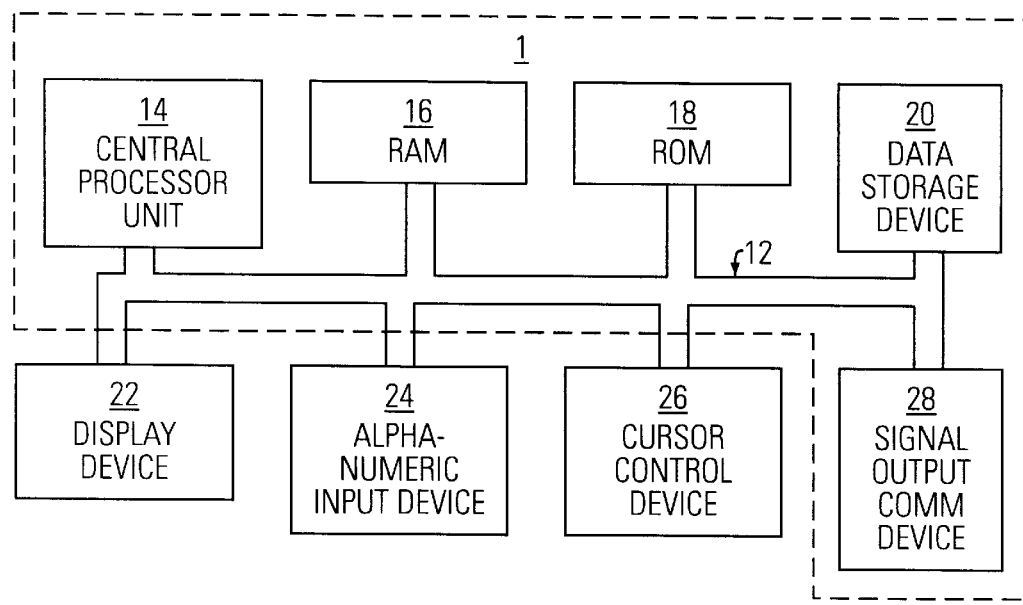
FIG. 1A is a schematic diagram of an exemplary computer system used as part of a simplified location display system in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as to not unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "designating", "incorporating", "calculating", "determining", "communicating" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Computer System Environment of the Present Invention

With reference now to FIG. 1A, portions of the present simplified location display system are comprised of computer executable instructions which reside in a computer system. FIG. 1A illustrates an exemplary computer system 1 used as a part of a simplified location display system in accordance with the present invention. It is appreciated that the simplified location display system 1 of FIG. 1A is exemplary only and that the present invention can operate within a number of different computer systems other than simplified location display systems shown in FIG. 1A, including general purpose computers systems, embedded computer systems, and stand alone computer systems specially adapted for automatically monitoring and determining the position of a vehicle relative to a given geographic database.

Simplified location display system 1 of FIG. 1A includes an address/data bus 12 for communicating information, a central processor unit 14 coupled to bus 12 for processing information and instructions. Simplified location display system 1 also includes data storage features such as a random access memory 16 coupled to bus 12 for storing information and instructions for central processor unit 14, a read only memory 18 coupled to bus 12 for storing static information and instructions for the central processor unit 14, and a data storage device 20 (e.g., a magnetic or optical disk and disk drive) coupled to bus 12 for storing information and instructions. Simplified location display system 1 of the present embodiment also includes a display device 22 coupled to bus 12 for displaying information. An alphanumeric input device 24 including alphanumeric and function keys is coupled to bus 12 for communicating information and command selections to central processor unit 14. Simplified location display system 1 also includes a cursor control device 26 coupled to bus 12 for communicating user input information and command selections to central processor unit 14, and a signal input output communication device 28 (e.g. a modem) coupled to bus 12.

Display device 22 of FIG. 1A, utilized with simplified location display system 1 of the present invention, may be a liquid crystal device, cathode ray tube, or other display device suitable for creating alphanumeric characters recognizable to the user. Cursor control device 26 allows the computer user to dynamically signal the two dimensional movement of a visible symbol (cursor) on a display screen of display device 22. Many implementations of cursor control device 26 are known in the art including a trackball, mouse, touch pad, joystick or special keys on alphanumeric input device 24 capable of signaling movement of a given direction or manner of displacement. Alternatively, it will be appreciated that a cursor can be directed and/or activated via input from alphanumeric input device 24 using special keys and key sequence commands. The present invention is also well suited to directing a cursor by other means such as, for example, voice commands.

Figure 1B:
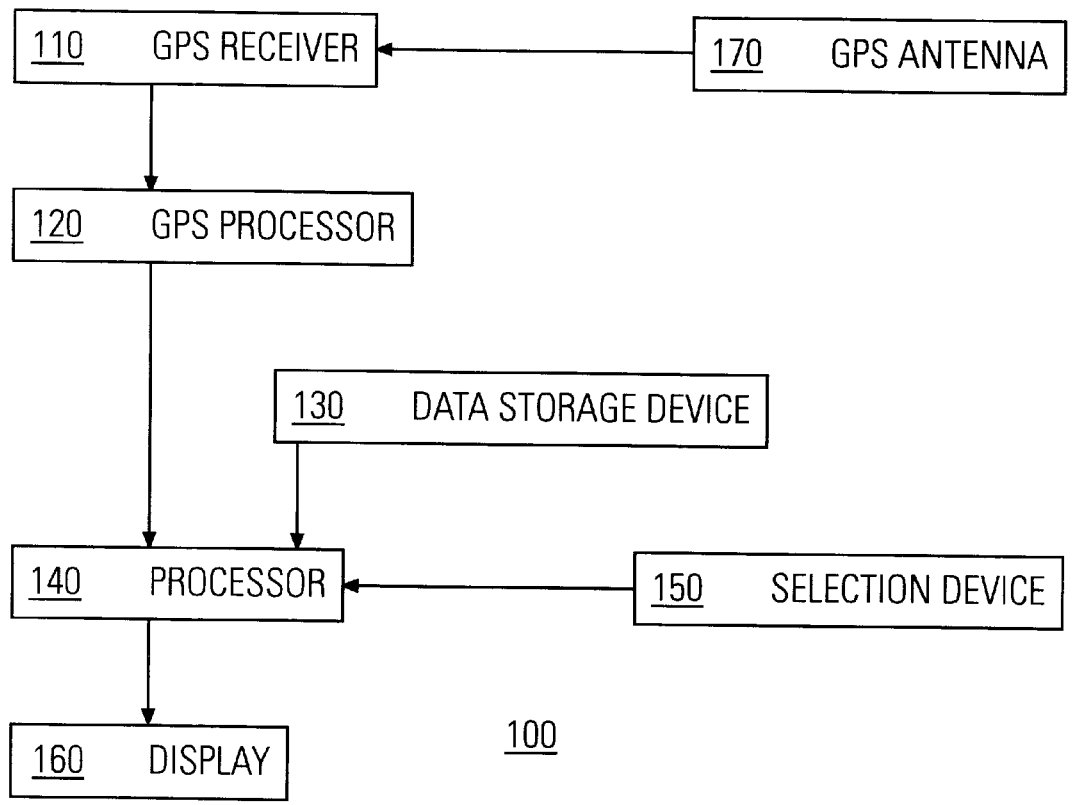
FIG. 1B is a diagram illustrating the components of a simplified location display system in accordance with the present invention.

FIG. 1B is a logical representation of components of simplified location display system 100 in accordance with one embodiment of the present invention. Simplified location display system 100 may be placed in a vehicle such as a car or a truck. In one embodiment, the signal time of flight from each satellite is measured and the ephemerides from satellites of the US Global Positioning System (GPS) are received by GPS receiver 110. GPS receiver 110 may have an internal antenna or may be linked to an external antenna such as GPS antenna 170. GPS receiver 110 is coupled to position signal processing circuitry located in GPS processor 120. Position signal processing circuitry in GPS processor 120 determines the location of GPS receiver 110 by analysis of the ephemerides. Position signal processing circuitry in GPS receiver 110 can also determine the direction of movement of the vehicle by comparing ephemerides received as the vehicle moves. Processor 140 receives the location coordinates and direction of travel from GPS receiver 110 and compares the location coordinates and direction of travel to the data in a map database stored data storage device 130. Processor 140 is coupled to GPS processor 120 and to data storage device 130. In one embodiment of the present invention processor 140 is a standard computer microprocessor such as a 68000 series RISC chip manufactured by Motorola Corporation and data storage device 130 is a non-volatile storage medium such as non-volatile random access memory device. Alternatively, other types of memory storage devices such as flash memory, tape, CD ROM, or DVD may be used.

With reference again to FIG. 1B, display 160 is also electrically coupled to processor 140. In one embodiment, display 160 is a two line, back lit, liquid matrix alphanumeric display. Alternatively, other types of displays such as active matrix liquid crystal displays and other types of flat panel displays could be used. Selection device 150 allows the user to select alternative display items. In one embodiment, selection device 150 is a standard 3-position toggle switch which is electrically connected to processor 140.

Although the present invention is described with reference to the use of satellites of the US Global Positioning System to determine position, any of a number of other systems such as GLONASS or LORAN or other systems could also be used to determine position.

Figure 2:
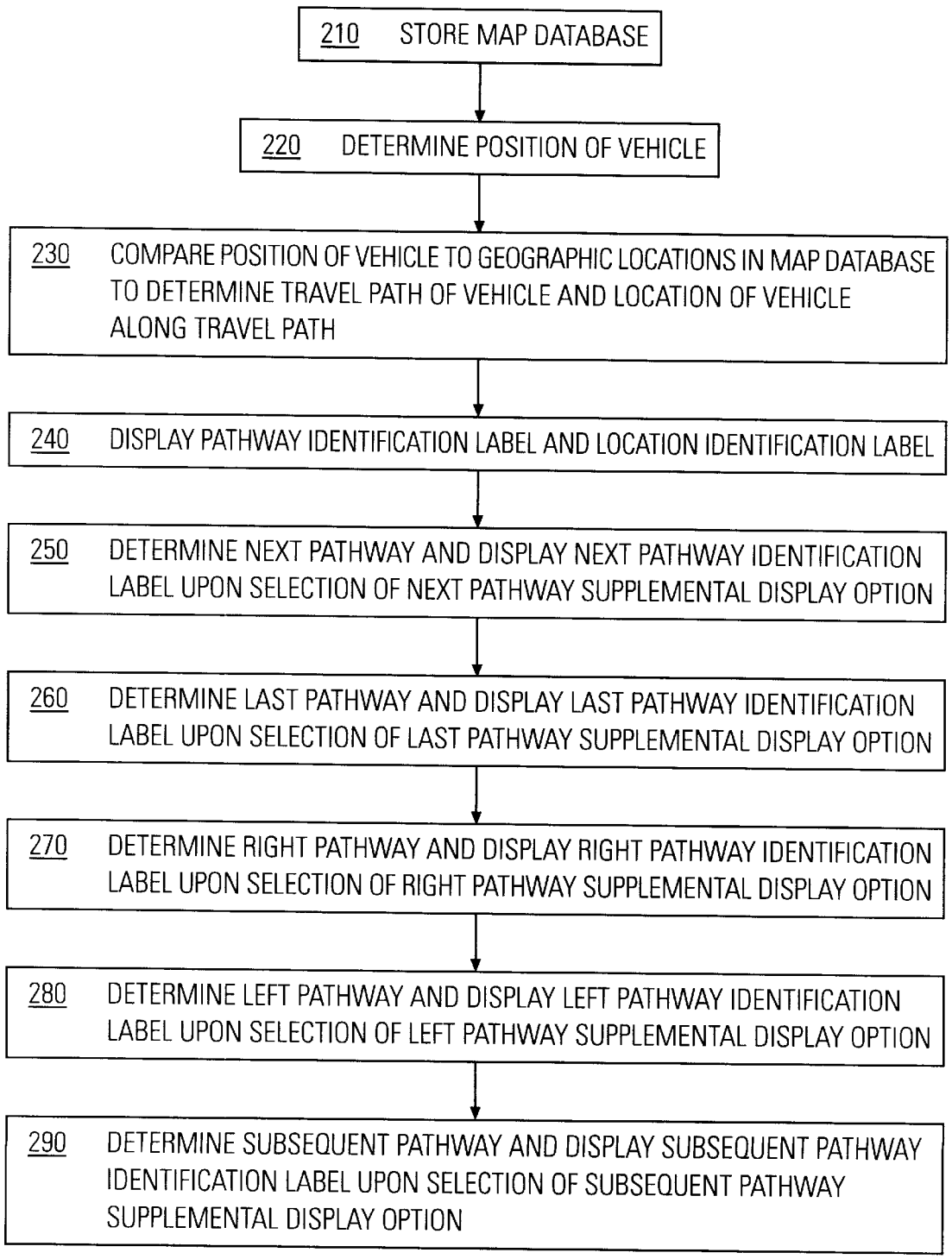
FIG. 2 is a diagram illustrating the steps for obtaining a simplified location display system in accordance with the present invention.

With reference to step 210 of FIG. 2, a map database containing location coordinates corresponding to travel paths and pathway identification labels corresponding to locations along travel paths is stored in data storage device 130 of FIG. 1B.

In operation, the position of the vehicle is first determined as shown by block 220 of FIG. 2. Position signal processing circuitry in GPS processor 120 of FIG. 1B determines the location of the vehicle by analysis of the time of flight and ephemerides received from satellites by GPS receiver 110 of FIG. 1B. Position signal processing circuitry in GPS receiver 110 of FIG. 1B can also determine the direction of movement of the vehicle by comparing time of flight and ephemerides received from satellites as the vehicle moves. Processor 140 of FIG. 1B receives the location coordinates corresponding to the position of the vehicle and compares the position of the vehicle to the data in the stored map database so as to determine the travel path of the vehicle and the location of the vehicle along the travel path as shown by step 220. The method for determining the path of the vehicle and the location of the vehicle along the travel path varies depending on the map database used.

In one embodiment of the present invention, the names of each of the travel paths are represented in the database by pathway identification labels and the positions along each travel path are represented by location identification labels. Depending on the structure of the database used, pathway identification labels and travel path labels are either associated with multiple map coordinates that define a specific area which corresponds to a portion of a travel path, or they are associated with map coordinates that define the endpoints of a segment of the travel path.

When using a databases that defines a travel path and a corresponding location identification label using a multiple map coordinates that define a specific area, the pathway identification label and the location identification labels are obtained by comparing the coordinates of the location of the vehicle to the coordinates within each specific area. However, this type of map database is large and cumbersome due to the large number of possible coordinates within each map database and the extensive processing required to compare the position of the vehicle to each possible coordinate in the map database. Therefore, most map databases identify specific segments of each travel path using the endpoints of the segment and location is determined by determining the closest segment to the position of the vehicle. The determination of the closest segment to a particular position coordinate map be obtained by using any number of known, commercially available software programs. For example, when using an Etak map database, manufactured by Etak Corporation of Menlo Park, Calif., or TIGER files, available through the U.S. Census Bureau as a map database, a software program such as, Map Info, manufactured by Map Info Corporation of Troy, N.Y., could be used to identify the closest map segment to a particular vehicle location.

Once the travel path and location along the travel path are determined, the corresponding pathway identification label and location identification label are displayed as shown by step 240 of FIG. 2. In one embodiment of the present invention, this display takes the form of a simple alphanumeric display. Alternatively, a voice synthesizer could be used to audibly broadcast the pathway identification label and the location identification label. As the vehicle moves, the position of the vehicle is constantly updated and the pathway identification label and the location identification label is updated.

In response to the selection of various supplemental display options by the user, labels corresponding to the selected supplemental display option are displayed as shown by steps 250, 260, 270, 280, and 290 of FIG. 2. As shown by block 250, upon the selection of the next pathway supplemental display option by the user, the next pathway is determined and the corresponding label, the next pathway identification label, is displayed. When the user selects the last pathway supplemental display option, the last pathway is determined and the corresponding label, the last pathway identification label is displayed. As shown by block 270, when the user selects the right pathway supplemental display option, the nearest pathway to the right of the travel path of the vehicle which runs roughly parallel to the travel path of the vehicle is determined and the corresponding label, the right pathway identification label, is displayed. When the user selects the left pathway supplemental display option, as shown by block 280, the nearest pathway to the left of the travel path of the vehicle which runs roughly parallel to the travel path of the vehicle is determined and the corresponding label, the left pathway identification label, is displayed. As shown by block 290, upon the users selection of the subsequent pathway supplemental display option, the subsequent pathway is determined and the corresponding label, referred to as the subsequent pathway identification label is displayed.

Figure 3:
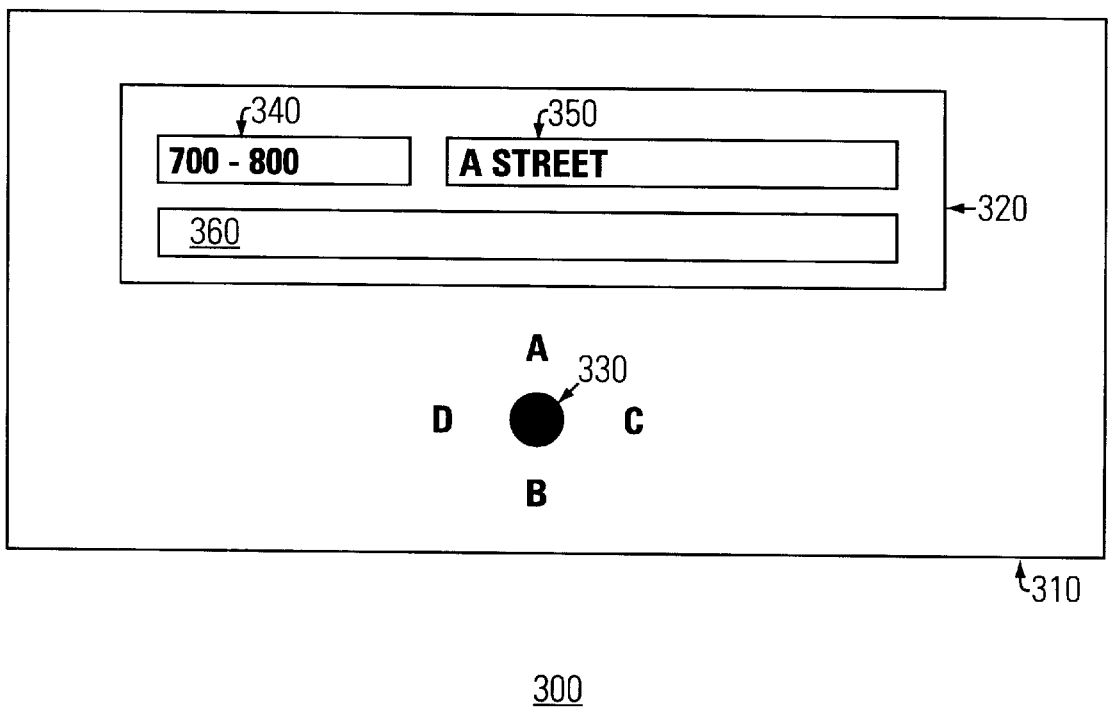
FIG. 3 is a front view of a simplified display system in accordance with the present invention.

In one embodiment of the present invention, simplified location display system 100 of FIG. 1B is implemented in a mobile unit such as simplified location display system 300 of FIG. 3. Simplified location display system 300 of FIG. 3 is shown to include display 320 which is attached to housing 310. The electronic components and processing circuitry necessary for determining position, data storage and a processor are located within housing 310. Housing 310 could either be mounted on top of the dashboard or it could be inserted into a opening in the dashboard designed to receive electronic components such as radios and CD players. Alternatively, the components of mobile unit 300 could be integrated into one or more of the dashboard mounted components. For example, the functions of housing 310 could be integrated into an AM/FM radio, a CD player, a tape player or a DVD player or into a component that is a combination AM/FM radio, CD player, tape player and DVD player.

In one embodiment, display 320 of FIG. 3 is a backlit liquid crystal display that can display two lines of alphanumeric text. The first line of display contains the display of location identification label 340 which identifies the street numbers of the block through which the vehicle is traveling and the pathway identification label 350 which identifies the name of the street over which the vehicle is traveling. The second line represented by block 360 is blank. Four way switch 330 allows the user to select supplemental display options and a label corresponding to the selected supplemental display option is then displayed in block 360. The positions of switch 330 are represented by the letters A–D. In one embodiment of the present invention, position A which corresponds to pushing up on switch 330 selects the next pathway supplemental display option and position C which corresponds to pushing down on switch 330 selects the last pathway supplemental display option. Pushing switch 330 to the right and into position B selects the right pathway identification option and pushing switch 330 to the left, into position D, selects the left pathway identification option. Pushing switch 330 repeatedly selects the subsequent pathway corresponding to the position of switch 330. After the user finishes requesting supplemental display information, the screen reverts to its default display which is the display of location identification label 350 and pathway identification label 340.

With reference again to FIG. 3, in an alternate embodiment, simplified location display system 300 is attached to the vehicle's CD player and map databases contained on CD ROM disks are placed into the CD player which couples some or all of the information stored in the map database to the data storage device contained within location display system 300. The CD is then removed and the CD player may be used for playing music CD's until such time that it is necessary to upload a new map database. In this embodiment, only that information necessary to obtain the simplified location display of the present invention needs to be uploaded. Thus information necessary for mapping needs not be uploaded, saving upload time and storage space. Alternatively, a map database may be uploaded using a direct coupling of an upload device, by wireless radio transmission to a receiver located in housing 310, or by using infrared signals. In another embodiment, a solid state memory card is used for data storage and map databases are updated by inserting a solid state memory card containing the required map database.

With reference again to FIG. 3, in one embodiment, the GPS receiver and the GPS processor and the data storage and the processor are stored in a separate location which may be, for example under the seat of the vehicle. In this embodiment, housing 310 simply includes switch 330 and display 320. Data storage is a CD ROM drive (not shown) which receives CD "disks" that contain map database information. Display 320 is coupled to the other components of simplified location display device 300 by a connection which may be, for example, a RS 232, RS 422 or Universal Serial Bus (USB) connection.

Figure 4:
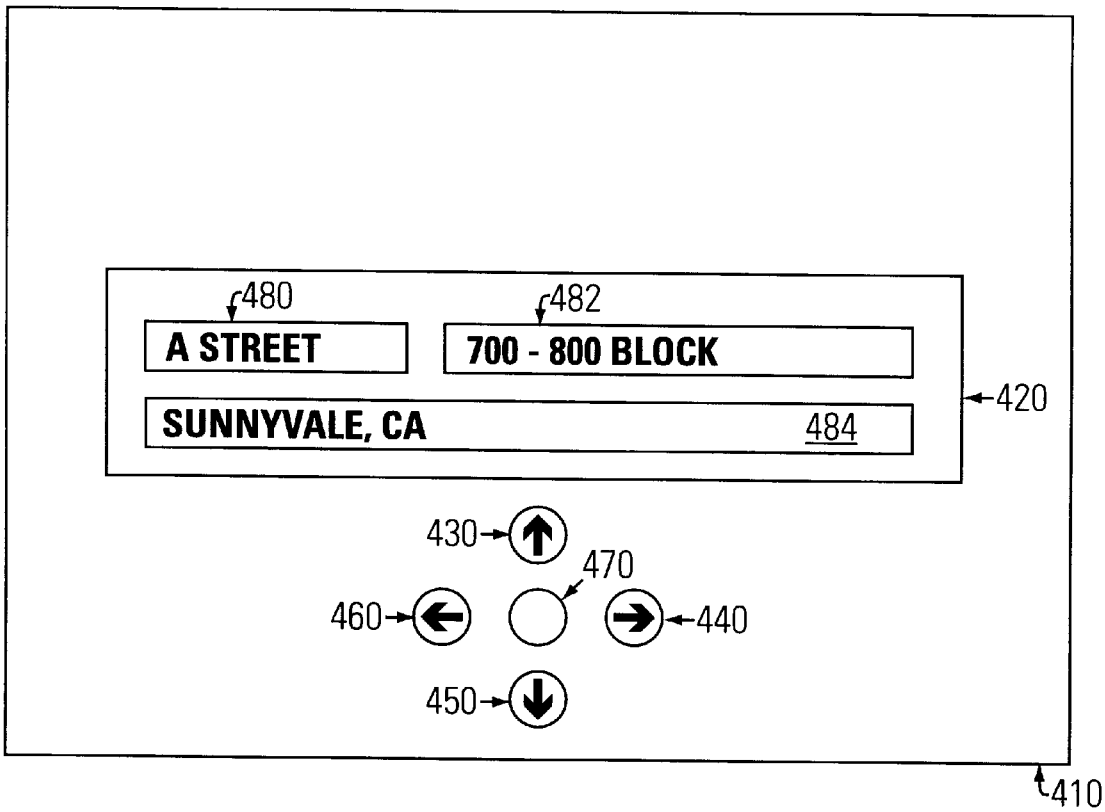
FIG. 4 is a front view of a simplified display system in accordance with the present invention.

FIG. 4 shows an embodiment in which multiple switches are used to select supplemental display options. Pushing switch 460 selects left pathway identification, and pushing switch 440 selects right pathway identification. Similarly, switch 430 selects next pathway identification and switch 450 selects last pathway identification. Button 470 may be used to obtain an additional supplemental display option. This additional supplemental display option may be time, date, or any of a number of different display items that would be of use to the user. The first line of display 420 contains the display of the pathway identification label 480 which identifies the name of the street over which the vehicle is traveling and location identification label 482 which identifies the street numbers of the block through which the vehicle is traveling. In one embodiment, display field 484 which is the second line of display 420, displays the city and the state which correspond to the vehicle's current position when the second line of display is not being used to display supplemental display options. Alternatively, other items such as date, time, speed, or heading could be displayed in field 484 when supplemental display options are not being displayed.

Figure 5:
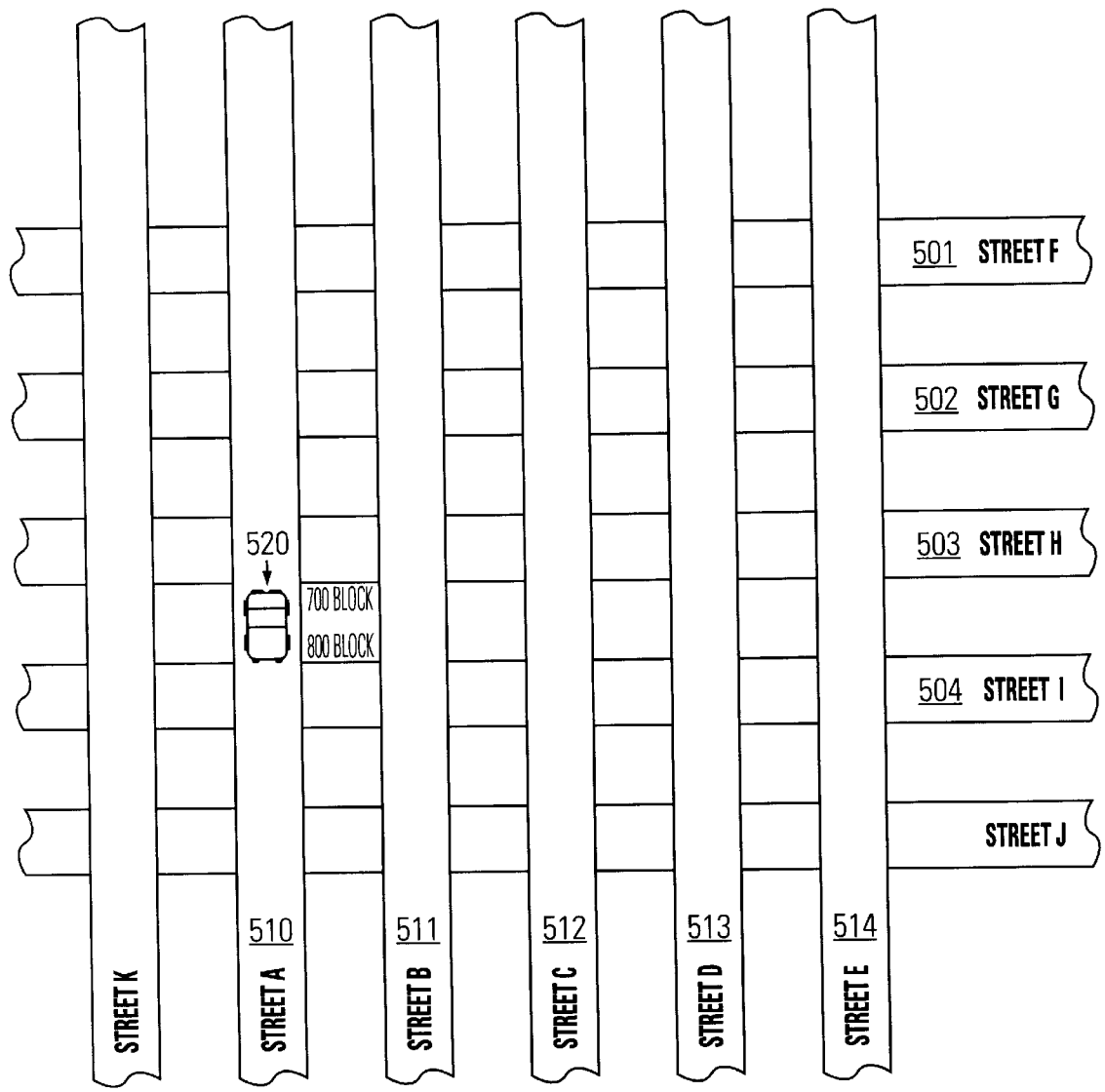
FIG. 5 is a diagram illustrating a geographic region which includes a vehicle including a simplified display system in accordance with the present invention.

FIG. 5 shows a representation of a geographic area within which vehicle 520 is driving. A simplified location display such as simplified location display 100 of FIG. 1B is located in vehicle 520. Since vehicle 520 is shown to be driving along street A, the path identification label would read "street A" and since vehicle 520 is located in the 700 to 800 block of Street A, the location identification label would read "700–800 block". Upon the user's selection of the next pathway identification label, the name of the next cross street is displayed which in this case would be the pathway identification label "street H". This selection could be accomplished, for example, by pressing button 430 of FIG. 4 or by moving switch 320 of FIG. 3 into position A. The user may obtain the names of subsequent streets by selecting the subsequent pathway supplemental display option. This selection could be accomplished, for example, by pressing button 430 of FIG. 4 a second time or by moving switch 320 of FIG. 3 into position A a second time and would result in the display of the second cross street in front of the vehicle which in this case would be the pathway identification label "street G". The user may view the next street by pressing button 430 of FIG. 4 a third time or by moving switch 320 of FIG. 3 into position A a third time which would result in the display of the third cross street in front of the vehicle which in this case would be the pathway identification label "street F".

Continuing with FIG. 5, upon the user's selection of the last pathway identification label, the name of the last cross street is displayed, which in this case would be the pathway identification label "street I". Upon the user's selection of the right pathway identification label, the name of the next roughly parallel street to the right is displayed, which in this case would be the pathway identification label "street B". Similarly, upon the user's selection of the left pathway identification label, the name of the next roughly parallel street to the left is displayed, which in this case would be the pathway identification label "street K".

The user may obtain the names of subsequent streets in any direction by selecting a subsequent pathway supplemental display option that corresponds to the desired direction. For example, by pressing button 430 of FIG. 4 twice or by moving switch 320 of FIG. 3 into position B twice in succession would result in the display of the second roughly parallel street to the right of the vehicle which in this case would be the pathway identification label "street C". Similarly, by pressing button 430 of FIG. 4 a third time or by moving switch 320 of FIG. 3 into position A a third time in succession, the third roughly parallel street to the right of the vehicle is displayed which in this case would be the pathway identification label "street D". Subsequent streets may be viewed by selecting the appropriate subsequent pathway supplemental display option.

Though the geographic region illustrated in FIG. 5 contains streets which run exactly parallel and perpendicular to the travel path of vehicle 520, most streets and roads are irregular. Thus, in order to determine the pathway identification label corresponding to a selected supplemental display option requires a determination of whether a particular street constitutes a roughly parallel street or whether it constitutes a cross street. Most map database processing programs contain algorithms for making this determination. For example, the Map Info program contains processing algorithms that can determine cross streets and roughly parallel streets.

In an alternate embodiment, the present invention may be incorporated into a software program for displaying a simplified location display on a computer such as computer 1 of FIG. 1A. In this embodiment, a fill size display device would be used and the simplified location display would be displayed through a window on the display of the display device. In one embodiment, the window is a two line display and pull-down menus are used to select the various supplemental display options. In an alternate embodiment, icons representing the various supplemental display options are displayed in a window on display device 22 and the user may select the various supplemental display options by using cursor control device 26 to point and click on the desired option.

Figure 6:
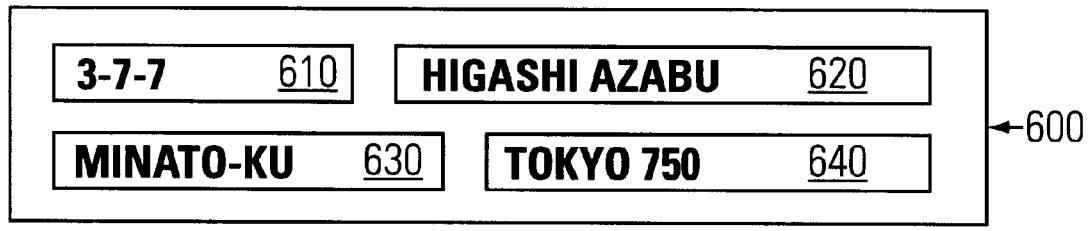
FIG. 6 is a display in accordance with the present invention.

Identification of travel paths and locations along travel paths are different in different geographical regions. Thus, the simplified location display of FIGS. 1A–5 may be varied to take into account the various conditions. For example, in Japan, addresses are not "street addresses" but rather are regions. Therefore, a simplified location display in Japan would include a street address such as address 610 of FIG. 6 and a neighborhood identification such as neighborhood identifier 620 and a city identifier such as city identifier 630 and a county identifier such as county identifier 640. The region identified would be the nearest region to the vehicle and subsequent display options would display adjoining and subsequent regions.

In other geographic regions such as, for example, London, England a combination of regional based identifiers and street grid type identifiers are used. For example, a simplified location display in London would contain either solely a region based identifier or a combination of a region based identifier and a street name and block number. Alternatively, map coordinates could be displayed so as to reference the location of a vehicle on a commonly used map. For example, a display of "THOMAS BROS. PAGE 783 6-6 SANTA CLARA, CA" could be used to reference coordinates on a map printed by Thomas Brothers.

Since the data processing capabilities and the memory requirements for each vehicle is less than the requirements of prior art systems that display graphical map images, significant cost savings are obtained. In addition, since the processing requirements are less than those of prior art systems that display graphical map images, results from selections are received faster. Furthermore, prior art map displays are difficult to read and the moving icon which is typically used is difficult to find quickly. In addition, there is a learning curve for learning to read and interpret a prior art map display which some users may be resistant to or find difficult. In the present invention there is no learning curve and no difficulty in interpretation as in prior art systems since users are familiar with reading street names and addresses. In addition, the driver is not distracted by having to read a complex map, making the system safer to use and possibly preventing traffic accidents.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A vehicle navigation system comprising:

a receiver for receiving position determining signals from satellites;

position signal processing circuitry coupled to said receiver for analyzing position determining signals so as to determine the position of said receiver;

a data storage device for storing map database information, said map database information including location coordinates corresponding to travel paths and pathway identification labels identifying said travel paths and location identification labels;

a processing device coupled to said position signal processing circuitry for receiving said position of said receiver, said processing device coupled to said data storage device for comparing said position of said receiver to said location coordinates so as to determine said pathway identification label and said location identification label corresponding to the position of said receiver;

a display device having an alphanumeric display, said display device coupled to said processing device for displaying said pathway identification label and said location identification label that correspond to the position of said receiver; and a selection mechanism for manually selecting supplemental display options, said selection mechanism connected to said processing device such that, upon the selection of a supplemental display option, said processing device displays the label corresponding to the selected supplemental display option and corresponding to the geographic location of said vehicle.

2. The vehicle navigation system of claim 1 wherein said processing device further comprises:

a microprocessor.

3. The vehicle navigation system of claim 1 wherein said supplemental display options further comprise a left pathway identification label, a right pathway identification label, a next pathway identification label, and a last pathway identification label.

4. The vehicle navigation system of claim 3 wherein said selection mechanism is a multiple position switch operable so as to select said left pathway identification label and said right pathway identification label and said next pathway identification label and said last pathway identification label, said processing device including logic for determining the pathway identification label corresponding to the nearest pathway to the left of the current position of said vehicle which runs roughly parallel to the travel path of said vehicle such that, upon the selection of said left pathway identification label, the pathway identification label for the nearest pathway to the left of the current position of said vehicle which runs roughly parallel to the travel path of said vehicle is displayed on said display device.

5. The vehicle navigation system of claim 3 wherein said selection mechanism is operable so as to select said right pathway identification label, said processing device including logic for determining the pathway identification label corresponding to the nearest pathway to the right of the current position of said vehicle which runs roughly parallel to the travel path of said vehicle such that, upon the selection of said right pathway identification label, the pathway identification label for the nearest pathway to the right of the current position of said vehicle which runs roughly parallel to the travel path of said vehicle is displayed on said display device.

6. The vehicle navigation system of claim 5 wherein said processing device includes logic for determining the pathway identification label corresponding to the nearest pathway to the right of the current position of said vehicle which runs roughly parallel to the travel path of said vehicle such that, upon the selection of said right pathway identification label, the pathway identification label for the nearest pathway to the right of the current position of said vehicle which runs roughly parallel to the travel path of said vehicle is displayed on said display device.

7. The vehicle navigation system of claim 6 wherein said processing device includes logic for determining the pathway identification label corresponding to the nearest pathway to in front of the current position of said vehicle which crosses the travel path of said vehicle such that, upon the selection of said next pathway identification label, the pathway identification label for the nearest pathway in front of the current position of said vehicle which crosses the travel path of said vehicle is displayed on said display device.

8. The vehicle navigation system of claim 7 wherein said processing device includes logic for determining the pathway identification label corresponding to the nearest pathway to the rear of the current position of said vehicle which crosses the travel path of said vehicle such that, upon the selection of said last pathway identification label, the pathway identification label for the nearest pathway to the rear of the current position of said vehicle which crosses the travel path of said vehicle is displayed on said display device.

9. The vehicle navigation system of claim 5 wherein said memory storage device comprises a non-volatile random access memory storage device.

10. The vehicle navigation and information system of claim 9 wherein said display device is located on the dashboard of a vehicle.

11. The vehicle navigation system of claim 9 wherein said display device is disposed in a component located in the dashboard of a vehicle, said component capable of functioning as an AM/FM radio.

12. A method for indicating the travel path of a vehicle comprising the steps of:

storing a map database representing travel paths within a geographic region in a vehicle, said map database including pathway identification labels and location identification labels corresponding to geographic locations within said geographic region;

determining the position of said vehicle using a position determination system;

determining the travel path of said vehicle by comparing the position of said vehicle to said geographic locations within said geographic region;

indicating the travel path of said vehicle by displaying the pathway identification label and the location identification label that corresponds to the geographic location of said vehicle within said geographic region; and displaying a label corresponding to a selected supplemental display option and corresponding to the geographic location of said vehicle upon the selection of a supplemental display option.

13. The method of claim 12 further comprising:

providing a user operable selection mechanism that allows for the selection of a plurality of supplemental display options, said plurality of supplemental display options including the display of a next pathway identification label and a last pathway identification label and a left pathway identification label and a right pathway identification label.

14. The method of claim 13 wherein said user operable selection mechanism further including an advancement feature, said plurality of supplemental display options including the display of subsequent next pathway identification labels, subsequent last pathway identification labels, subsequent right pathway identification labels and subsequent left pathway identification labels such that, by selecting said advancement feature, said user may view pathway identification labels corresponding to pathways that are subsequent to the pathways indicated by said next pathway identification label, said last pathway identification label, said right pathway identification label and said left pathway identification label corresponding to the geographic location of said vehicle.

15. In a computer system including a processor coupled to a bus, and a memory unit coupled to said bus for storing information, a computer implemented method for indicating the travel path of a vehicle, said computer-implemented method comprising the steps of:

storing a map database representing travel paths within a geographic region in said memory unit, said map database including pathway identification labels and location identification labels corresponding to geographic locations within said geographic region;

determining the position of said vehicle using a position determination system;

determining the travel path of said vehicle by comparing the position of said vehicle to said geographic locations within said geographic region;

indicating the travel path of said vehicle by displaying the pathway identification label and the location identification label that corresponds to the geographic location of said vehicle within said geographic region;

providing a user operable selection mechanism coupled to said processor, said user operable selection mechanism operable for selection of a supplemental display option; and displaying a label corresponding to a selected supplemental display option and corresponding to the geographic location of said vehicle upon the selection of a supplemental display option.

16. The computer implemented method of claim 15 wherein said user operable selection mechanism allows for the selection of a plurality of supplemental display options including the display of a next pathway identification label and a last pathway identification label and a left pathway identification label and a right pathway identification label.

17. The computer implemented method of claim 16 wherein said user operable selection mechanism further includes an advancement feature, said plurality of supplemental display options further including the display of subsequent next pathway identification labels, subsequent last pathway identification labels, subsequent right pathway identification labels and subsequent left pathway identification labels.

* * * * *